United States Patent [19]

Slusarchyk et al.

[11] 4,006,221
[45] Feb. 1, 1977

[54] DERIVATIVES OF DIUMYCIN A AND DIUMYCIN A'

[75] Inventors: William A. Slusarchyk, Belle Mead; Frank Lee Weisenborn, Titusville, both of N.J.

[73] Assignee: E. R. Squibb & Sons, Inc., Princeton, N.J.

[22] Filed: Aug. 12, 1975

[21] Appl. No.: 603,997

Related U.S. Application Data

[63] Continuation-in-part of Ser. No. 434,522, Jan. 18, 1974, abandoned, which is a continuation-in-part of Ser. No. 341,015, March 14, 1973, abandoned.

[52] U.S. Cl. .......................................... 424/118
[51] Int. Cl.$^2$ ..................................... A61K 35/00
[58] Field of Search ................................. 424/118

Primary Examiner—Jerome D. Goldberg
Attorney, Agent, or Firm—Lawrence S. Levinson; Merle J. Smith; Burton Rodney

[57] ABSTRACT

This invention relates to lower alkyl or aryl lower alkyl esters of Diumycin A and Diumycin A', their basic hydrolysis products, and alkyl aminolysis hydrolysis products of Diumycin A and Diumycin A', which are effective against gram-positive bacteria.

4 Claims, No Drawings

DERIVATIVES OF DIUMYCIN A AND DIUMYCIN A'

RELATED APPLICATIONS

The present invention is a continuation-in-part of copending application Ser. No. 434,522 filed Jan. 18, 1974, now abandoned which in turn is a continuation-in-part of application Ser. No. 341,015 filed Mar. 14, 1973, now abandoned.

OBJECTS OF THE INVENTION

It is an object of the present invention to provide new compounds which are effective against gram-positive bacteria. Another object is to provide methods for the preparation of these new compounds. A further object is to provide a method for the administration of these new compounds. Still another object is to provide compositions for the administration of these new compounds. These and other objects of the present invention will be apparent from the following description.

SUMMARY OF THE INVENTION

It has now been found that lower alkyl and aryl lower alkyl esters of Diumycin A and Diumycin A', their hydrolysis products, and their aminolysis hydrolysis products are effective against gram-positive bacteria. The lower alkyl and aryl lower alkyl esters are prepared by treating Diumycin A or Diumycin A' with a diazo compound such as diazomethane or diazoethane in the presence of a suitable polar organic solvent such as a lower alkanol or an alkanol-ether mixture. The lower alkyl and aryl lower alkyl ester hydrolysis products of Diumycin A and Diumycin A' are obtained by subjecting the alkyl esters of Diumycin A or Diumycin A' to treatment with ammonium hydroxide or another inorganic base at elevated pH. Aminolysis products are obtained by treating the lower alkyl or arylalkyl esters of Diumycin A or Diumycin A' with excess amine or hydrazine; subsequent treatment of the aminolysis product with an inorganic base at elevated pH provides the aminolysis hydrolysis product.

DETAILED DESCRIPTION

The esters of Diumycin A and Diumycin A' include alkyl esters of from 1 to 6 carbon atoms and phenyl lower alkyl esters. Such esters are obtained by treating Diumycin A or Diumycin A' with at least 3 mols of a diazo compound per mol of Diumycin A or Diumycin A'. The diazo compound has the formula

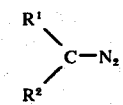

wherein $R^1$ and $R^2$ are hydrogen or an alkyl radical of from 1 to 5 carbon atoms or phenyl radical. The reaction takes place at temperatures of from about 0° C to about room temperature in a relatively short time, e.g., from about five minutes to about one hour. The reaction is carried out in the presence of an alcohol, such as methanol, ethanol, or propanol, or an alcohol-ether mixture, such as methanol-ether, or methanol-dimethoxyethane. The resulting product is one wherein a hydrogen atom of substantially all acidic groups of Diumycin A or Diumycin A' including the acidic hydrogen of the chromophore group,

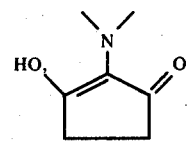

has been replaced by the

group. Suitable diazo compounds are, for example, diazomethane, diazoethane, diazopropane, diazopentane and phenyldiazomethane.

The esters of Diumycin A and/or Diumycin A' of the present invention have UV absorption (water) in the range of from about 252 to about 254 mμ.

Treatment of the esters of either Diumycin A or Diumycin A', prepared as described above, with at least 2 equivalents of base per mol of Diumycin A or Diumycin A' at an elevated pH of about 10 to about 11.5, preferably at about pH 11, results in the preparation of Diumycin A or Diumycin A' ester hydrolysis products. Most preferably, sufficient base is added to maintain the pH at about 11. The base may be ammonium hydroxide or an aqueous alkali metal hydroxide, such as, for example, LiOH, NaOH, or KOH, or an alkaline earth metal hydroxide such as, for example, $Ca(OH)_2$ or $Ba(OH)_2$. The treatment is carried out for a period of time from about 30 minutes to about 16 hours at a temperature of from about 0° to about 40° C.

The hydrolysis derivatives of the esters of Diumycin A and/or Diumycin A' of the present invention have UV absorption (water) at about 248 mμ at about pH 2.2, and at about 258 mμ at both about pH 5 and about pH 11.

Treatment of an ester of Diumycin A or Diumycin A' prepared as described above, with at least about 3 mols of a primary or secondary amine per mol of Diumycin A or Diumycin A' at a temperature of from about room temperature to about 100° C for a period of from about 1 to about 48 hours results in an aminolysis product. Such treatment results in replacement of the

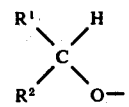

group of the chromophore group

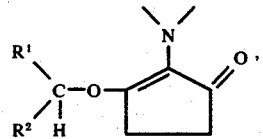

(introduced as described above) by a substituted amino group

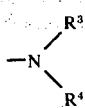

wherein R³ and R⁴ may be hydrogen, alkyl of from 1 to 6 carbon atoms, cycloalkyl from 3 to 6 carbon atoms, or aryl lower alkyl. The amine itself, if it is a liquid under reaction conditions can be employed as solvent, or else an inert solvent is used. Suitable solvents are, for example, dimethylformamide (DMF), tetramethylurea (TMU), dioxane or dimethoxyethane. The amine is used in a quantity of at least about 3 mols/mol of Diumycin A or Diumycin A'. Suitable amines are, for example, ammonia; monoalkyl and dialkylamines wherein the alkyl radical has from 1 to 6 carbon atoms, and cycloalkyl amines of from 3 to 6 carbon atoms, e.g., methylamine, ethylamine, n-propylamine, i-propylamine, t-butylamine, dimethylamine or diethylamine, cyclopropylamine, cyclobutylamine, cyclopentylamine, or cyclohexylamine; phenyl-substituted alkylamines, e.g, benzylamine, phenethylamine; a 5- or 6-membered saturated heterocyclic amine which has 1 to 2 heteroatoms selected from nitrogen, oxygen, or sulfur, e.g., pyrrolidine, thiazolidine, piperidine, morpholine, thiomorpholine, N-methylpiperazine, 4-methylpiperidine, and 5- or 6-membered heterocyclic substituted alkylamines wherein the alkyl radical has from 1 to 5 carbon atoms and wherein the heterocyclic ring may contain one or two heteroatoms selected from oxygen, nitrogen and sulfur, e.g., N-(2-aminoethyl)-piperidine, 4-pyridylmethylamine, N-methyl-N'-(2-aminoethyl)piperazine, or N-(3-aminopropyl)thiomorpholine.

The aminolysis derivatives of the esters of Diumycin A and/or Diumycin A' of the present invention have UV absorption (water) in the range of from about 274 mµ to about 285 mµ.

The aminolysis product of Diumycin A or Diumycin A', which contains the chromophore group

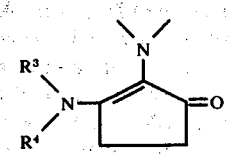

prepared as described above may be converted by treatment with excess aqueous base at elevated pH to an aminolysis hydrolysis product (acid or salt form) that still possesses the chromophore group

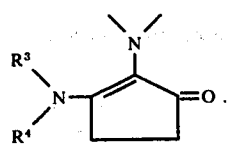

The reaction takes place at a pH of about 10 to about 11.5, preferably at about pH 11 at temperatures of from about 0° to about 40° C for a period of from about 30 minutes to about 16 hours. At least 2 equivalents of base are employed per mol of Diumycin A or Diumycin A' aminolysis product. Most preferably sufficient base is added to maintain the pH at about 11. Suitable bases are, for example, ammonium hydroxide or an aqueous alkali metal hydroxide such as, for example, LiOH, NaOH, or KOH or an alkaline earth metal hydroxide such as, for example, Ca(OH)₂, Ba(OH)₂. The salt resulting from treatment with base may be converted to the free acid by treatment with a suitable ion exchange resin. Other salts, e.g., the Mg salt, or a trialkylammonium salt, wherein the alkyl radical has from 1 to 6 carbons, may be prepared in known manner from the free acid.

The aminolysis hydrolysis derivatives of the esters of Diumycin A and/or Diumycin A' of the present invention have UV absorption (water) in the range of from about 274 mµ to about 285 mµ.

Infra-red spectra of the aminolysis and aminolysis hydrolysis products of the present invention have an intense absorption band in the region of from about 1550 to about 1580 cm⁻¹. This intense band serves to distinguish the aminolysis and aminolysis hydrolysis products from the ester and ester hydrolysis products.

It will be appreciated that UV absorption is an important technique for identifying the various products of the present invention. UV absorption of the chromophore

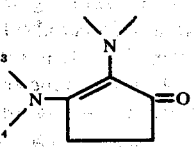

varies with the

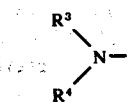

substituent, whereas the IR spectrum remains substantially the same. The apparent reason for this is that the molecules of the products of the invention are so large that IR is not sufficiently sensitive to detect distinctions between products, whereas UV can detect the same [see J. J. panouse and C. Sannie, Bull, Soc. Chem. Fr., 1374 (1956)]. same [see J. J. Panouse and The esters, ester hydrolysis products, and aminolysis hydrolysis products of Diumycin A and Diumycin A' are active in vitro and in vivo in mammalian species, e.g., mice and rats, against gram-positive bacteria such as Staphylococcus aureus, Bacillus subtitis, and Streptococcus pyogenes. For this purpose the compounds of the invention may be administered by injection after formulation into injectable dosage forms according to conventional pharmaceutical practice. For this purpose the compounds of the invention may be used in quantities similar to that of Diumycin A and Diumycin A'. They may also be used as growth promoters in such species as swine and poultry. For such purpose the compounds of the invention may be incorporated into feedstuffs in quantities similar to that employed for Diumycin A and Diumycin A'.

While the present invention has been described with particular reference to alkyl and arylalkyl esters of Diumycin A and Diumycin A' as starting materials, it is to be understood that any ester of Diumycin A or Diumycin A' may be used to prepare the aminolysis or aminolysis hydrolysis product as long as the ester group reacts similarly to those ester groups explicitly described herein.

The following examples illustrate the present invention without, however, limiting the same thereto. All temperatures are given in degrees Centigrade.

EXAMPLE 1

Diumycin A Methyl Ester

Diumycin A (acid form, 233 mg) is dissolved in 2 ml of methanol, cooled to 0° C, and treated alternately with 6 ml of ethereal diazomethane solution and 6 ml of methanol, both at 0° C, until a yellow color persists in the reaction mixture. The excess diazomethane is removed by bubbling a stream of nitrogen through the solution. Evaporation of the solvent gives 234 mg of diumycin A methyl ester as a white powder.

A 150 mg portion of the white powder is applied to a Sephadex LH-20 column (2.5 × 80 cm), packed in methanol, and chromatographed. Fractions of 6 ml are collected, and the progress of the column is followed by ultraviolet measurements at 254 m$\mu$. Fractions 38–43 are combined and evaporated to a residue (123 mg) that is taken up in methanol, precipitated by addition of ether, and dried in vacuo to give an analytical sample of diumycin A methyl ester as a white powder having: $\lambda_{max}^{H_2O}$ 252 m$\mu$, $E^{1\%}$=80; melting point 170°(tan), 176°(brown), 180°(black); elemental analysis, carbon, 48.64; hydrogen, 6.57; nitrogen, 4.11; phosphorus, 1.83; O-methyl, 7.24; oxygen (by difference), 38.85; neutralization equivalent by nonaqueous titration (perchloric acid-acetic acid), 1900; molecular weight by ultracentrifuge, 1730 (EtOH), 140,000 (aqueous buffer pH 6.85). The ester is soluble in water, lower alcohols, pyridine, dioxane, dimethylformamide, and dimethylsulfoxide.

EXAMPLE 2

Diumycin A and Diumycin A' Methyl Esters

A mixture of approximately equal amounts of diumycin A and diumycin A' (acid form, 400 mg) is dissolved in 6 ml of methanol, cooled to 0° C, and treated alternately with ethereal diazomethane solution and methanol, both at 0° C, until a yellow color persists. The excess diazomethane is removed with a stream of nitrogen, and the solvent is removed under reduced pressure to give a white powder that is applied to a Sephadex LH-20 column (2.5 × 80 cm), packed in methanol, and chromatographed. Fractions of 6 ml are collected and analyzed by ultraviolet measurements at 254 m$\mu$. Fractions 38–44 are combined and evaporated to give 343 mg of mixture of diumycin A and diumycin A' methyl esters as a white powder. The mixture has $\mu_{max}^{H_2O}$ 254 m$\mu$, $E^{1\%}$=83. On paper chromatography, using acid washed paper, in the system n-butanol: pyridine: acetic acid: water:methanol (4:4:1:1:2) diumycin A and diumycin A' methyl esters have $R_f$ 0.94 whereas diumycin A and diumycin A' have $R_f$ 0.53; in the system n-butanol: pyridine: acetic acid: water (6:4:1:3), diumycin A and diumycin A' methyl ester have $R_f$ 0.77 whereas diumycin A and diumycin A' have $R_f$ 0.25. Visualization of the chromatograms is accomplished by using iodine vapors.

EXAMPLE 3

Diumycin A Methyl Ester Hydrolysis Product I and Diumycin A Methyl Ester Hydrolysis Product II To a stirred solution of 130 mg of diumycin A methyl ester, prepared as in Example 1, in 2.0 ml of water under nitrogen is added, by means of an automatic buret (Radiometer, Copenhagen, Denmark), 0.029N sodium hydroxide to adjust the pH to 11.0. The solution is stirred for 6 hrs. with the pH being maintained at 11.0 by means of the automatic buret. The solvent is removed under reduced pressure, and the residue is taken up in water and adjusted to pH 2.2 by the addition of Dowex-50 (acid form) ion exchange resin. The resin is filtered off, and the filtrate is evaporated, with the aid of n-propanol, to a white powder.

The white powder is taken up in a minimum amount of methanol and chromatographed on a Sephadex LH-20 column (2.5 × 80 cm) packed in methanol. The chromatography is monitored by a continuous-flow ultraviolet cell at 254 m$\mu$, and fractions of 6 ml are collected. Fractions 38–40 are combined and evaporated to a residue (30 mg) that is applied to another Sephadex LH-20 column (2.5 × 80 cm) packed in methanol. Fractions 38–40 from this second chromatogram are combined and evaporated to a residue that is taken up in methanol, precipitated with ether, and dried in vacuo to give diumycin A methyl ester hydrolysis product I (acid form) 20 mg, as a white powder. It has: melting point (dec.) 175°(tan), 177°(brown), 185°(black); $\lambda_{max}^{H_2O(pH\ 5.0)}$ 258 m$\mu$, $E^{1\%}$=101, $\lambda_{max}^{H_2O(pH\ 2.2)}$ 248 m$\mu$, $E^{1\%}$=68, $\lambda_{max}^{H_2O(pH\ 11.3)}$ 258 m$\mu$, $E^{1\%}$=100; elemental analysis, carbon 48.15; hydrogen, 6.75; nitrogen, 3.96; phosphorus, 1.84; oxygen (by difference), 39.30; O-methyl, 4.18; water of hydration, 6.92; neutralization equivalent by potentiometric titration (aqueous sodium hydroxide), 1520 and 1620, IR(KBr) 3400, 2930, 1720, 1670, 1630(sh), 1530, 1430, 1370, 1325, 1260, 1210(sh), 1100(sh), 1065, 1035(sh), 965, and 880 cm$^{-1}$, calculated Empirical formula (based on P) $C_{68}H_{101}N_5O_{35}P\cdot 6H_2O$ containing 2 O-methyl groups, molecular weight about 1688. It is soluble in water, lower alcohols, dilute acid and dilute alkali.

Fractions 42–46 from the initial Sephadex LH-20 column are combined and evaporated to a residue (60 mg) that is applied to another Sephadex LH-20 column (2.5 × 80 cm) packed in methanol. Fractions of 6 ml are collected in this chromatogram. Fractions 40–46 are combined and evaporated to a residue that is precipitated from methanol ether and dried in vacuo to give 49 mg of diumycin A methyl ester hydrolysis product II (acid form) as a white powder. It has: melting point (dec.) 160°(tan), 170°(brown), 180°(black); $\lambda_{max}^{H_2O(pH\ 5.0)}$ 258 m$\mu$, $E^{1\%}$=109, $\lambda_{max}^{H_2O(pH\ 2.2)}$ 248 m$\mu$, $E^{1\%}$=72, $\lambda_{max}^{H_2O(pH\ 11.3)}$ 258 m$\mu$, $E^{1\%}$=107; elemental analysis, carbon, 47.78; hydrogen, 6.84; nitrogen, 4.27; phosphorus, 1.85; oxygen (by difference), 39.26; O-methyl, 3.92; water of hydration, 6.73; neutralization by potentiometric titration (aqueous sodium hydroxide) 1210 and 1090, IR(KBr) 3400, 2930, 1720, 1670(sh), 1625, 1540, 1435, 1370, 1325, 1260, 1210(sh), 1140(sh), 1060, 1035(sh), 965 and 880 cm$^{-1}$, calculated Empirical formula (based on N) $C_{52}H_{79}N_4O_{27}P\cdot 5H_2O$ containing 2 O-methyl groups, molecular weight about 1313. It is soluble in water, lower alcohols, dilute acid, and dilute alkali.

EXAMPLE 4

Diumycin A and Diumycin A' Isopropylamine Aminolysis Hydrolysis Products (Acid and Ammonium Salt Forms)

To a solution of 176 mg of mixture of diumycin A methyl ester and diumycin A' methyl ester in 0.6 ml tetramethylurea is added 0.1 ml of isopropylamine. The mixture is stirred under nitrogen for 16 hours at room temperature. Addition of ether gives a precipitate that is washed with ether and dried to yield 159 mg white powder having $\lambda_{max}^{H_2O} 276$ m$\mu$, $E^{1\%}=151$.

This powder is stirred under nitrogen with 3 ml of 2N ammonium hydroxide at pH 11.0 for 2 hours at room temperature and then left to stand for 16 hours. The aqueous ammonia is removed, in vacuo, to give crude diumycin A and diumycin A' isopropylamine aminolysis hydrolysis products (ammonium salt form) as a residue. The residue is taken up in water and treated with Dowex-50(H$^+$) ion exchange resin to adjust the pH to 2.2. The resin is filtered off, and the filtrate is evaporated, with the aid of methanol and n-propanol, to another residue. This residue is taken up in methanol and precipitated by the addition of ether to give, after drying, 129 mg of diumycin A and diumycin A' isopropylamine aminolysis hydrolysis products (acid form) as a white powder having $\lambda_{max}^{H_2O}$ 276 m$\mu$, $E^{1\%}=161$, melting point (dec.) 172°(tan), 176°(brown), 178°(black), IR(KBr) 3400, 2930, 1730(sh), 1675, 1565, 1430(sh), 1375, 1330, 1225, 1150(sh), 1070, 1040(sh), 970 cm$^{-1}$, and 880 cm$^{-1}$, and elemental analysis: carbon, 45.56; hydrogen, 6.59; nitrogen, 5.68; phosphorus, 1.84; oxygen (by difference), 40.33.

EXAMPLE 5

Diumycin A and Diumycin A' Morpholine Aminolysis Hydrolysis Products (Acid and Ammonium Salt Forms)

To a solution of 167 mg. of a mixture of 50% diumycin A methyl ester and 50% diumycin A' methyl ester in 1.40 ml tetramethylurea is added 0.2 ml of morpholine. The mixture is stirred for 16 hours at room temperature under nitrogen. Ether is added to give a precipitate that is washed repeatedly with ether, dried and reprecipitated from methanol ether to give, after drying, 159 mg of diumycin A and diumycin A' morpholine aminolysis products as a white powder having $\lambda_{max}^{H_2O}$ 283 m$\mu$, $E^{1\%}=118$.

To this mixture of aminolysis products, dissolved in 1 ml of 2N ammonium hydroxide, is added further 2N ammonium hydroxide to adjust the pH to 11.0. The solution is stirred under nitrogen at room temperature for 1.5 hours and left to stand for 16 hours. The aqueous ammonia is removed under reduced pressure to give crude diumycin A and diumycin A' morpholine aminolysis hydrolysis products (ammonium salt form) as a residue. This residue is dissolved in water and treated with Dowex-50 (H$^+$ form) ion exchange resin to adjust the pH to 2.2. The resin is filtered off, and the filtrate is evaporated, with the aid of n-propanol, to another residue. This residue is taken up in methanol and precipitated by addition of ether to give, after drying, 130 mg of diumycin A and diumycin A' morpholine aminolysis hydrolysis products (acid form) as a white powder having $\lambda_{max}^{H_2O}$ 282 m$\mu$, $E^{1\%}=147$, melting point (dec.) 170°(tan), 174°(brown), 178°(black), IR(KBr) 3400, 2930, 1730(sh), 1675, 1560, 1435, 1380, 1325, 1230, 1100(sh), 1070, 1040(sh), 970, and 880 cm$^{-1}$, and elemental analysis, carbon 48.29; hydrogen, 5.42; nitrogen 6.71; phosphorus, 1.97; oxygen (by difference), 37.61.

EXAMPLE 6

Diumycin A Pyrrolidine Aminolysis Hydrolysis Products (Ammonium Salt Form)

To 5 mg of diumycin A methyl ester in 0.1 ml tetramethylurea is added 0.1 ml of pyrrolidine. The mixture is stirred for 16 hours at room temperature under nitrogen. Ether is added to yield a precipitate that is washed three times with ether, dried, and taken up in methanol and reprecipitated with ether to give, after drying, 5 mg of white powder.

The white powder is dissolved in 1 ml of water, adjusted to pH 11.0 with 5N ammonium hydroxide, and stirred for 16 hours at room temperature under nitrogen. Evaporation of the aqueous ammonia, with the aid of n-propanol, gives 5 mg of diumycin A pyrrolidine aminolysis hydrolysis products (ammonium salt form) as a white powder having $\lambda_{max}^{H_2O}$ 284 m$\mu$, $E^{1\%}=148$.

EXAMPLE 7

Diumycin A N-(2-Aminoethyl)piperidine Aminolysis Hydrolysis Products (Ammonium Salt Form)

To 5 mg of diumycin A methyl ester in 0.1 ml tetramethylurea is added 0.1 ml of N-(2-aminoethyl)-piperidine. The mixture is stirred for 16 hours at room temperature under nitrogen, worked up as described in Example 6, and treated with ammonia as described in Example 6 to give 4 mg of diumycin A N-(2-aminoethyl)piperidine aminolysis hydrolysis products (ammonium salt form) as a white powder having $\lambda_{max}^{H_2O}$ 274 m$\mu$, $E^{1\%}=116$.

EXAMPLE 8

Diumycin A N-Aminomorpholine Aminolysis Hydrolysis Products (Ammonium Salt Form)

Diumycin A methyl ester (5 mg), dissolved in 0.1 ml of tetramethylurea is stirred with 0.1 ml of N-aminomorpholine under nitrogen for 16 hours at room temperature. Workup and subsequent treatment with ammonia at pH 11.0 as described in Example 6 gives 4 mg of diumycin A N-aminomorpholine aminolysis hydrolysis products (ammonium salt form) as a white powder having $\lambda_{max}^{H_2O}$ 273 m$\mu$, $E^{1\%}=109$.

EXAMPLE 9

Diumycin A N,N-Diethylamine Aminolysis Hydrolysis Products (Ammonium Salt Form)

Diumycin A methyl ester (5 mg) in 0.1 ml of tetramethylurea is stirred with 0.1 ml of N,N-diethylamine at room temperature for 16 hours under nitrogen. Addition of ether gives a precipitate that is treated with aqueous ammonia as in Example 6 to give, after workup, 5 mg of diumycin A N,N-diethylamine aminolysis hydrolysis products (ammonium salt form) as a white powder having $\lambda_{max}^{H_2O}$ 227 m$\mu$, $E^{1\%}=113$.

EXAMPLE 10

Diumycin A Methylamine Aminolysis Hydrolysis Products (Ammonium Salt Form)

To 5 mg of Diumycin A methyl ester dissolved in 0.1 ml of tetramethylurea is added 0.2 ml of tetramethylurea saturated with methylamine. The mixture is stirred for 16 hours at room temperature under nitrogen. Ether is added to produce a precipitate that is washed three times with ether and dried. The dried precipitate is taken up in 1 ml. water adjusted to pH 11.0 using 5N ammonium hydroxide, and stirred for 16 hours at room temperature under nitrogen. Evaporation of the aqueous ammonia, with the aid of n-propanol, produces 5 mg of diumycin A methylamine aminolysis hydrolysis products (ammonium salt form) as a white powder having $\lambda_{max}^{H_2O}$ 275 m$\mu$, $E^{1\%}$=133.

EXAMPLE 11

Diumycin A Isopropylamine Aminolysis Hydrolysis Products (Ammonium Salt Form)

A mixture of Diumycin A methyl ester (80 mg) and 100 ml of isopropylamine in 100 ml of tetramethylurea is stirred at room temperature under nitrogen for 16 hrs. The excess isopropylamine is removed under reduced pressure, and ether is added to give a precipitate having $\lambda_{max}^{H_2O}$ 276 m$\mu$, $E^{1\%}$=146. The precipitate is applied to a Sephadex LH-20 column (2.5 × 80 cm) packed in methanol. Fractions of 6 ml are collected. Fractions 29–32 are pooled and evaporated to a residue. The latter is taken up in methanol and precipitated with ether to give 25 mg of iumycin A isopropylamine aminolysis product (ester form) as a white powder. It has: $\lambda_{max}^{H_2O}$ 276 m$\mu$, $E^{1\%}$=157; elemental analysis; C, 50.17; H, 7.34; N, 5.00; P, 1.90; (based on P $C_{68}H_{119}N_6O_{36}P$ with 2 O-methyl, and 1 N-isopropyl amine group, MW 1628; O (by difference), 35.59; O-methyl, 4.14. A 5 mg sample of this aminolysis product (ester form) is stirred with aqueous ammonia at pH 11 for 16 hours at room temperature under nitrogen. Evaporation of the aqueous ammonia with the aid of n-propanol, yields 5 mg of diumycin A isopropylamine aminolysis hydrolysis products (ammonium salt form).

EXAMPLE 12

Diumycin A 4-Aminomethylpyridine Aminolysis Hydrolysis Products (Ammonium Salt)

A mixture of diumycin A methyl ester (5 mg) and 100 ml 4-aminomethyl pyridine in 100 ml tetramethylurea is stirred for 16 hours at room temperature under nitrogen. Further treatment as described in Example 6 yields the desired product as a residue (5 mg) having $\lambda_{max}^{H_2O}$ 276 m$\mu$, $E^{1\%}$=108 and 266 m$\mu$(sh), $E^{1\%}$=103.

EXAMPLE 13

Diumycin A Ethyl Ester

Following the procedure of Example 1 but substituting for diazomethane an equivalent amount of diazoethane, the title compound is obtained.

EXAMPLE 14

Diumycin A and Diumycin A' Cyclohexylamine Aminolysis Hydrolysis Product (Acid and Ammonium Salt Form)

Following the procedure of Example 4 but substituting for isopropylamine an equivalent amount of cyclohexylamine, the title products are obtained.

EXAMPLE 15

Diumycin A Benzylamine Aminolysis Hydrolysis Product (Ammonium Salt Form)

Following the procedure of Example 11 but substituting for isopropylamine an equivalent amount of benzylamine, the title product is obtained.

EXAMPLE 16

Diumycin A Cyclobutylamine Aminolysis Hydrolysis Product (Ammonium Salt Form)

Following the procedure of Example 15 but substituting for isopropylamine an equivalent amount of cyclobutylamine, the title product is obtained.

EXAMPLES 17 — 20

Following the procedure of Example 6 but substituting for pyrrolidine an equivalent amount of the heterocyclic amine indicated below, the corresponding Diumycin A heterocyclic amine aminolysis hydrolysis product is obtained (ammonium salt form):

17 thiomorpholine
18 N-methylpiperazine
19 N-methyl-N'-(2-aminoethyl)piperazine
20 N-(3-aminopropyl)thiomorpholine

EXAMPLE 21

Diumycin A Benzyl Ester

Following the procedure of Example 1 but substituting for diazomethane an equivalent amount of phenyldiazomethane, the title compound is obtained.

EXAMPLE 22

Diumycin A Benzyl Ester Hydrolysis Product

Treating the product of Example 21 according to the procedure of Example 3 yields the title product.

EXAMPLE 23

Diumycin A Ethyl Ester Hydrolysis Product

Treating the product of Example 13 according to the procedure of Example 3 yields the title product.

EXAMPLE 24

Diumycin A Ethyl Ester Cyclohexylamine Aminolysis Hydrolysis Product (Ammonium Salt Form)

Treating the product of Example 13 according to the procedure of Example 11 but substituting an equivalent amount of cyclohexylamine for the isopropylamine of Example 11 yields the title product.

EXAMPLE 25

The following data shows the bactericidal activity of representative compounds of the present invention:
Antimicrobial Activity In Vitro (MIC, mcg/ml)

| Compound | Organism | | |
|---|---|---|---|
| | S. aureus | S. pyogenes | B. subtilis |
| Diumycin A methyl ester hydrolysis product I | 3.1 | 0.05 | 0.3 |
| Diumycin A methyl ester hydrolysis product II | 0.8 | 0.032 | 0.3 |
| Diumycin A and Diumycin A' morpholine aminolysis hydroly- | | | |

-continued

| Compound | Organism | | |
|---|---|---|---|
| | S. aureus | S. pyogenes | B. subtilis |
| sis products (acid form) 1:1 ratio | 0.03 | 0.008 | 0.06 |
| Diumycin A and Diumycin A' isopropylamine aminolysis hydrolysis products (acid form), 1:1 ratio | 0.018 | 0.003 | 0.02 |

EXAMPLE 26

The following data shows the in vivo activity of representative compounds of the present invention when administered subcutaneously to mice infected with lethal doses of Streptococcus pyogenes $C_{203}$.

| Compound | $PD_{50}$ (mg/kg) |
|---|---|
| Diumycin A and Diumycin A' morpholine aminolysis hydrolysis products (acid form), 1:1 ratio | 0.94 |
| Diumycin A and Diumycin A' isopropylamine aminolysis hydrolysis products (acid form), 1:1 ratio | 1.49 |

What is claimed is:
1. An aminolysis hydrolysis derivative of esters of Diumycin A and Diumycin A' wherein the radical

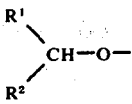

of the chromophore

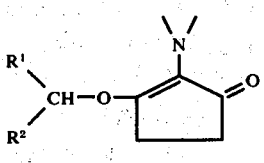

is replaced by a radical of the formula

and at least one of the remaining

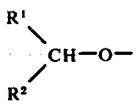

groups has been converted to the free acid, wherein $R^3$ and $R^4$ together with nitrogen atom to which they are joined form a morpholino group, said derivative having $\lambda_{max}^{H_2O}$ 282 m$\mu$, $E^{1\%}=147$, IR spectrum as follows: IR(KBr) 3400, 2930, 1730(sh), 1675, 1560, 1435, 1380, 1325, 1230, 1100(sh), 1070, 1040(sh), 970, and 880 cm$^{-1}$, the following elemental analysis: C 48.29%; H 5.42%; N 6.71%; P 1.97%; and O 37.61%, and a melting point (dec) of 170° C (tan), 174° (brown), 178° (black).

2. An aminolysis hydrolysis derivative of esters of Diumycin A and Diumycin A' wherein the radical

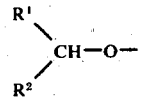

of the chromophore

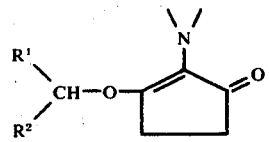

is replaced by a radical of the formula

and at least one of the remaining

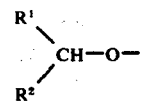

groups has been converted to the free acid, and wherein

is isopropylamino, said derivative having $\lambda_{max}^{H_2O}$ 276 m$\mu$, $E^{1\%}=161$, IR spectrum as follows: IR(KBr) 3400, 2930, 1730(sh), 1675, 1565, 1430(sh), 1375, 1330, 1225, 1150(sh), 1070, 1040(sh), 970 cm$^{-1}$, and 880 cm$^{-1}$, the following elemental analysis: C 45.56%; H 6.59%; N 5.68%; P 1.84% and O 40.33%; and a melting point (dec) of 172° (tan), 176° (brown), 178° (black).

3. A hydrolysis product I of a Diumycin A methyl ester derivative wherein one or two of the methyl ester groups have been converted to the free acid, said product having $\lambda_{max}^{H_2O\ (pH\ 5.0)}$ 258 m$\mu$, $E^{1\%}=101$, and IR spectrum as follows: IR(KBr) 3400, 2930, 1720, 1670, 1630(sh), 1530, 1430, 1370, 1325, 1260, 1210(sh), 1100(sh), 1065, 1035(sh), 965, and 880 cm$^{-1}$, the following elemental analysis: carbon 48.15; hydrogen, 6.75; nitrogen, 3.96; phosphorus, 1.84; oxygen (by difference), 39.30; O-methyl, 4.18; water of hydration, 6.92; and a melting point (dec.) 175°(tan), 177°(brown), 185°(black).

4. A hydrolysis product II of a Diumycin A methyl ester derivative wherein one or two of the methyl ester groups have been converted to the free acid, said product having $\lambda_{max}^{H_2O\ (pH\ 5.0)}$ 258 m$\mu$, $E^{1\%}=109\%$, and IR spectrum as follows: IR(KBr) 3400, 2930, 1720, 1670(sh), 1625, 1540, 1435, 1370, 1325, 1260, 1210(sh), 1140(sh), 1060, 1035(sh), 965, and 880 cm$^{-1}$, the following elemental analysis: carbon, 47.48; hydrogen, 6.84; nitrogen, 4.27; phosphorus, 1.85; oxygen (by difference), 39.26; O-methyl, 3.92; water of hydration, 6.73; and a melting point (dec.) 160°(tan), 170°(brown), 180°(black).

* * * * *

UNITED STATES PATENT AND TRADEMARK OFFICE
CERTIFICATE OF CORRECTION

PATENT NO. : 4,006,221
DATED : February 1, 1977
INVENTOR(S) : William A. Slusarchyk et al It is certified that error appears in the above-identified patent and that said Letters Patent are hereby corrected as shown below:

Column 4, line 48, "panouse" should read --Panouse--.
Column 4, line 49, please delete "same [see J. J. Panouse and".
Column 5, line 58, "µmax" should read --$\lambda$max--.
Column 6, line 57, "$H_2O$(pH 1/.3)" should read --$H_2O$(pH 11.3)--.

Signed and Sealed this

Twenty-fourth Day of May 1977

[SEAL]

Attest:

RUTH C. MASON
*Attesting Officer*

C. MARSHALL DANN
*Commissioner of Patents and Trademarks*